United States Patent
Lowth et al.

(10) Patent No.: US 10,279,447 B2
(45) Date of Patent: May 7, 2019

(54) DAMPER

(71) Applicant: ROLLS-ROYCE PLC, London (GB)

(72) Inventors: Stewart Lowth, Nottingham (GB); Adam Nagy, Loughborough (GB)

(73) Assignee: ROLLS-ROYCE plc, London (GB)

( * ) Notice: Subject to any disclaimer, the term of this patent is extended or adjusted under 35 U.S.C. 154(b) by 508 days.

(21) Appl. No.: 15/174,375

(22) Filed: Jun. 6, 2016

(65) Prior Publication Data
US 2016/0380506 A1    Dec. 29, 2016

(30) Foreign Application Priority Data
Jun. 23, 2015 (GB) .................................. 1511013.3

(51) Int. Cl.
*F16F 6/00* (2006.01)
*B23Q 11/00* (2006.01)

(52) U.S. Cl.
CPC ............ *B23Q 11/0032* (2013.01); *F16F 6/00* (2013.01); *F16F 2222/06* (2013.01)

(58) Field of Classification Search
CPC ...... F16F 6/00; F16F 2222/06; B23Q 11/0032
USPC ......................................................... 310/51
See application file for complete search history.

(56) References Cited

U.S. PATENT DOCUMENTS

| | | | | |
|---|---|---|---|---|
| 2,412,228 A | * | 12/1946 | Oetzel | B60T 13/74 180/282 |
| 3,488,535 A | * | 1/1970 | Baermann | H02K 49/00 310/105 |
| 4,583,752 A | * | 4/1986 | Breitbach | B60G 11/32 280/124.165 |
| 2012/0318609 A1 | * | 12/2012 | Hartman | A62B 1/04 182/10 |

(Continued)

FOREIGN PATENT DOCUMENTS

| CN | 2278110 Y | 4/1998 |
|---|---|---|
| CN | 203130893 U | 8/2013 |

(Continued)

OTHER PUBLICATIONS

Nov. 14, 2016 Search Report issued in British Patent Application No. 1609280.1.

(Continued)

*Primary Examiner* — Terrance L Kenerly
(74) *Attorney, Agent, or Firm* — Oliff PLC

(57) ABSTRACT

A damper damping motion of a first object relative to a second object, the damper including: a casing including a conductor; plurality of magnetic elements serially in a first direction within the casing and each including at least one magnet so adjacent magnetic elements repel in the first direction; at least one magnetic element is moveable relative to other magnetic elements within and relative the casing; the conductor allows movement of at least one moveable magnetic element relative to the casing induces current in (Continued)

the conductor, the magnetic field produced by current providing a braking force to the moving magnetic element; at least one moveable magnetic elements includes a first connecting part and either casing or at least one other magnetic element includes a second connecting part, one connecting part for connecting the damper to the first object, and other connecting part for connecting the damper to the second object.

17 Claims, 4 Drawing Sheets

(56) References Cited

U.S. PATENT DOCUMENTS

| | | |
|---|---|---|
| 2015/0224582 A1 | 8/2015 | Kolluru et al. |
| 2016/0258506 A1* | 9/2016 | Deane .................... F16F 15/03 |

FOREIGN PATENT DOCUMENTS

| | | |
|---|---|---|
| EP | 2905107 A1 | 8/2015 |
| GB | 1100492 A | 1/1968 |
| WO | 2010/136049 A1 | 12/2010 |
| WO | 2012/015488 A1 | 2/2012 |

OTHER PUBLICATIONS

Dec. 18, 2015 Search Report issued in British Patent Application No. 1511013.3.

Kolluru, K. and D. Axinte (2014). "Novel ancillary device for minimising machining vibrations in thin wall assemblies." International Journal of Machine Tools and Manufacture 85(0): 79-86.

Kolluru, K., et al. (2013). "A solution for minimising vibrations in milling of thin walled casings by applying dampers to workpiece surface." CIRP Annals—Manufacturing Technology 62(1): 415-418.

* cited by examiner

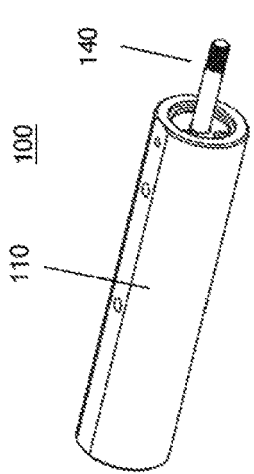
Fig. 1
Fig. 2
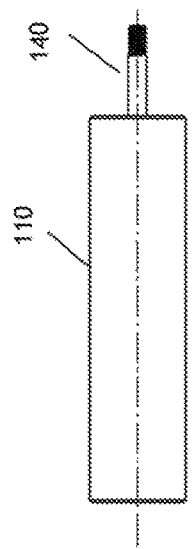
Fig. 3
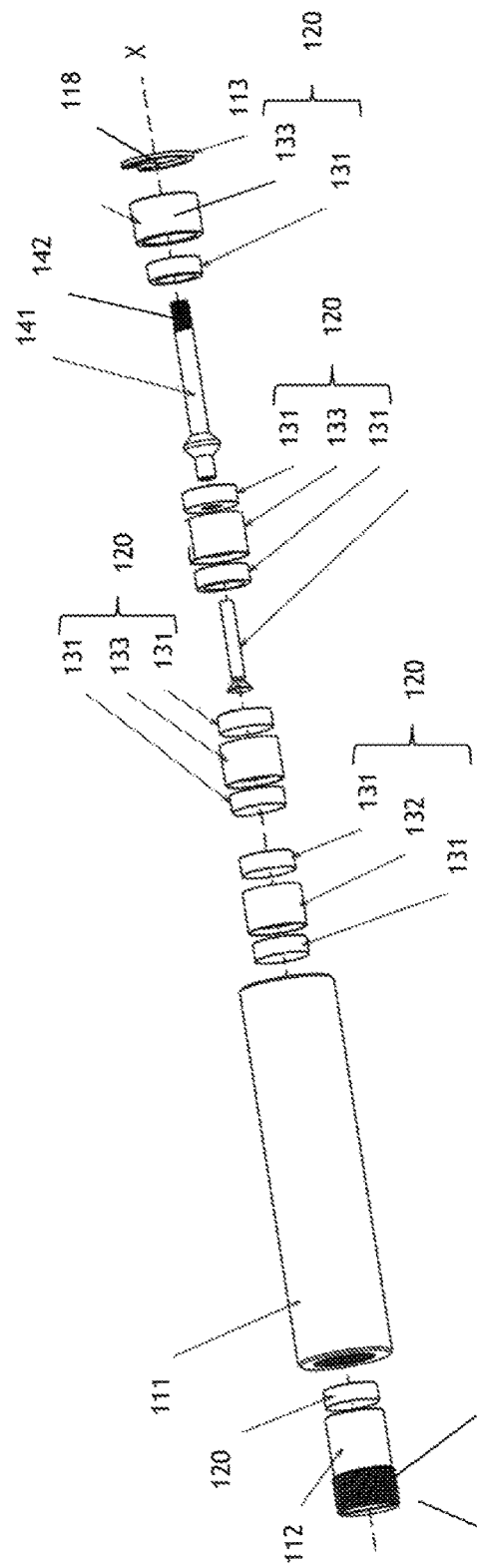
Fig. 4

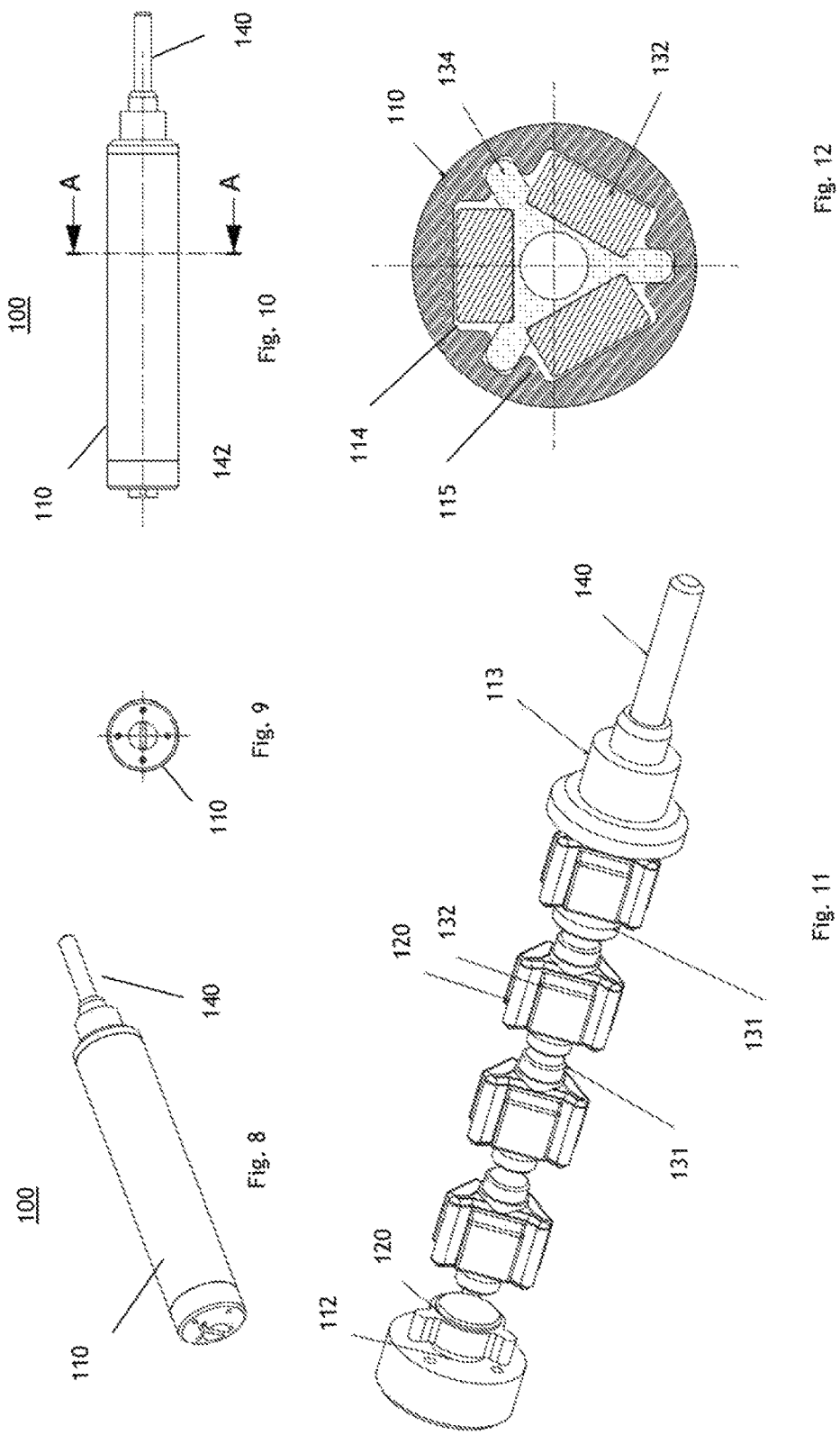

DAMPER

BACKGROUND

The present disclosure relates to a damper for damping the motion of a first object relative to a second object. More specifically the damper May be used to damp an object to be machined relative to an apparatus for machining the object.

Machining may refer to any process by which an object is cut or shaped by a controlled material removal process. Types of machining include: lathing, whereby an object is turned against a cutting tool, the principal apparatus used being a lathe; milling, whereby a cutting tool rotates to bring cutting edges against the object, the principal apparatus used being a milling machine; grinding, whereby an abrasive tool rotates to bring abrasive surfaces against the object, the principal apparatus used being a grinding machine; and drilling, whereby holes are produced or refined by bringing a rotating cutter with cutting edges at the lower extremity into contact with the object, the principal apparatus used being a drill.

A damper is used to apply a reacting force to slow a moving object. The reaction force increases with the velocity of the object. This can minimise potentially harmful vibrations to structures. A number of damping technologies exist but these have limitations including size, weight and required maintenance.

One type of damper is based on fluid motion. A force exerted on the damper by an actuator displaces fluid between reservoirs through a port. Depending on the size of the port and properties of the fluid, a certain resistance is provided to the actuator for a given velocity. However, such dampers require precise manufacture and the fluid needs to be contained and controlled. Due to the required sealing and motion of such dampers, they are prone to failure due to fluid loss and require frequent servicing.

Another type of damper is based on eddy currents. These use a magnet and a conductor which move relative to each other to induce eddy currents in the conductor. The magnetic fields of the eddy currents oppose the motion on of the magnet. Such dampers are typically large and are used in applications involving large forces. For example, such dampers are used to damp buildings in the event of an earthquake or in high speed braking systems on trains. Although reliable, these dampers are very complex and expensive.

In relation to machining, damping can be used to minimise the vibrations induced in an object being machined that result from the motion of a cutting tool. However, space limitations prevent the use of many damping technologies due to their physical size. Further, some damping technologies are not suitable for applications where the object being machined is particularly brittle, for example ceramics.

SUMMARY OF THE INVENTION

According to an aspect of the present disclosure there is provided a damper for damping the motion of a first object relative to a second object, the damper comprising: a casing comprising an electrical conductor; a plurality of magnetic elements arranged. serially in a first direction within the casing and each comprising at least one magnet arranged such that adjacent magnetic elements repel each other in the first direction; wherein at least one of the magnetic elements is moveable relative to the other magnetic elements within the casing and relative to the casing; the electrical conductor is arranged such that movement of at least one of the moveable magnetic elements relative to the casing induces an electrical current in the electrical conductor, the magnetic field produced by the electrical current providing a braking force to the moving magnetic element; and at least one of the moveable magnetic elements includes a lint connecting part and either the casing or at least one of the other magnetic elements includes a second connecting part, one of the connecting parts being for connecting the damper to the first object, and the other of the connecting parts being for connecting the damper to the second object.

Optionally, the at least one magnet of each of the magnetic elements includes at least one spring magnet having a dipole substantially in the first direction.

Optionally, the at least one magnet of at least one of the magnetic elements includes two spring magnets, and optionally the two spring magnets are arranged serially in the first direction, and/or are fixed in relation to each other and/or repel each other in the first direction.

Optionally, the at least one magnet of at least one of the magnetic elements includes at least one braking magnet having a dipole substantially perpendicular to the first direction.

Optionally, a plurality of braking magnets are provided at regular intervals around an axis in the first direction in at least one magnetic element.

Optionally, an even number of braking magnets are provided in at least one magnetic element.

Optionally, at least one of the magnetic elements at an end of the serial arrangement of magnetic elements is secured to the casing.

Optionally, the casing comprises an adjustment device, for adjusting the position at which the magnetic element is secured to the casing.

Optionally, the damper may further comprise a motor configured to drive the adjustment device.

Optionally, the damper comprises a sensor for sensing the relative motion between the first and second objects, wherein the motor is configured to drive the adjustment device based on the output of the sensor.

Optionally, at least one of the magnetic elements comprises a low friction material at an interface between the magnetic element and the casing.

Optionally, the casing has a cylindrical inner surface having a central axis in the first direction.

Optionally, the cross section of the inner surface of the casing in a plane perpendicular to the first direction has a plurality of lobes.

Optionally, the braking magnets are arranged within the lobes.

Optionally, at least one magnetic element further comprises a detachable part.

An apparatus for machining an object, the apparatus comprising the damper of the previous aspect, wherein the damper is configured to damp the motion of the object relative to at least part of the apparatus tor machining the object. According to an aspect of the present disclosure there is provided a kit of parts comprising: the damper of the first aspect, wherein at least one magnetic element is configured such that a detachable part may be attached to said magnetic element; and a plurality of detachable parts having different masses and configured to be attachable to the at least one magnetic element to change the mass of the magnetic element.

According to an aspect of the present disclosure there is provided a method of machining an object comprising:

damping the motion of an object being machined relative to an apparatus for machining the object using the damper of the first mentioned aspect.

BRIEF DESCRIPTION OF THE DRAWINGS

Examples of the disclosure will now be described by way of non-limiting example only with reference to the accompanying drawings, in which:

FIG. 1 shows an end view of the damper of FIG. 3;
FIG. 2 shows a side view of the damper of FIG. 3;
FIG. 3 shows an isometric view of an example damper;
FIG. 4 shows an expanded view of components forming the damper in FIG. 3;
FIG. 8 shows an isometric view of an example damper;
FIG. 9 shows an end view of the damper of FIG. 8;
FIG. 10 shows a side view of the damper of FIG. 8
FIG. 11 shows the internal components or the damper of FIG. 8;
FIG. 12 shows a cross-section A-A through the damper of FIG. 8.

DETAILED DESCRIPTION

Figure 5:
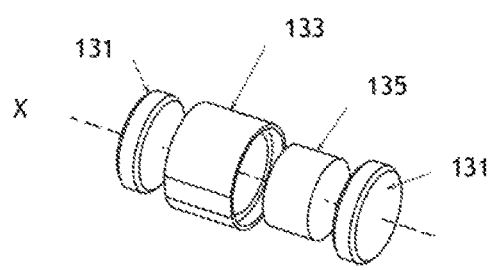
FIG. 5 shows an example magnetic element.

The present disclosure relates to a damper 100 for damping the motion of a first object O relative to a second object. The damper 100 may be used as a support damper. The damper 100 may be used to support the first object O. In use, the damper 100 is connected to both the first object O and the second object such that these objects can move relative to each other. The first object O may be an object to be machined. The first object O may be made of a brittle material, such as ceramic; or a soft fragile material such as wax. Alternatively, the object may be any other material, e.g. metal, plastic or wood. The second object may be an apparatus for machining the first object O. Machining may refer to any process by which an object is cut or shaped by a controlled material removal process. The second object may be an apparatus for lathing e.g. a lathe, whereby an object is turned against a cutting tool. The second object may be an apparatus for milling, e.g. a milling machine, whereby a cutting tool rotates to bring cutting edges against an object. The second object may be an apparatus for grinding, e.g. a grinding machine, whereby an abrasive tool rotates to bring abrasive surfaces against the object. The second object may be an apparatus for drilling, e.g. a drill, whereby boles are produced or refined by bringing a rotating cutter with cutting edges at the lower extremity into contact with an object.

As shown in the Figures, the damper 100 of the present disclosure comprises a casing 110. The casing 110 comprises an electrical conductor. The damper 100 also comprises a plurality of magnetic elements 120 arranged serially in a first direction X within the casing 110. That is, the magnetic elements 120 are arranged one after the other, e.g. in a line. Each of the magnetic elements 120 comprises at least one magnet arranged such that adjacent magnetic elements 120 repel each other in the first direction X. For example, the magnetic elements 120 may include only a single magnet (e.g. the endmost elements in FIG. 4) or more than one magnet (e.g. the central elements in FIG. 4). At least one of the magnetic elements 120 is moveable relative to the other magnetic elements 120 within the casing 110 and relative to the casing 100. For example, each of the magnetic elements 120 may be moveable relative to each other and the casing 100, or alternatively, some of the magnetic elements 120 may be stationary relative to the casing 110. For example, one or both magnetic elements 120 at opposite ends of the serial arrangement of magnetic elements 120 may be stationary. In the example damper 100 of FIG. 4, the magnetic elements 120 at either end are stationary and the others are moveable. In the example of FIG. 11, the magnetic element 120 on the far left of the Figure is stationary and the others are moveable. The number of magnetic elements is not limited, five magnetic elements 120 may be provided as shown in the figures.

The electrical conductor is arranged such that movement of at least one of the moveable magnetic elements 120 relative to the casing 110 induces an electrical current in the electrical conductor. The magnetic field produced by the electrical current provides a braking force to the moving magnetic element 120. The electrical conductor may be made from a material which is not ferromagnetic, e.g. a non-ferrous material. The electrical conductor may be made from metal e.g. copper or aluminium.

At least one of the moveable magnetic elements 120 includes a first connecting part 140, and either of the casing 110 or at least one of the other magnetic elements 120 includes a second connecting part, one of the connecting parts being for connecting the damper 100 to the first object and the other of the connecting parts being for connecting the damper 100 to the second object. For example, the first object may be connected to a moveable magnetic element 120 and the second object may be connected to the casing 110. Alternatively, the first object may be connected to a moveable magnetic element 120 and the second object may be connected to another moveable magnetic element 120 (or alternatively a stationary magnetic element 120).

In use, the damper 100 is connected to the first object O and the second object via the connecting parts. Motion of the first object O relative to the second object causes the at least one of the movable magnetic elements 120, connected to the first object O or second object to move relative to other magnetic elements 120 and the casing 110, at least one of which is connected to the other of the first object O or second object. The movement of the at least one of the movable magnetic elements 120 relative to the other magnetic elements is resisted due to the repelling force in the first direction between adjacent magnetic elements 120. Within the casing 110, the magnetic elements 120 form a magnetic spring. That is, the repelling force between adjacent magnetic elements 120 is proportional to and in the opposite direction to the displacement of the moveable magnetic elements 120, as compared to an equilibrium position. Additionally, the movement of the movable magnetic elements 120 relative to the casing 110 is damped due to a braking force provided by the magnetic field of the electrical currents induced in the conductor as a result of the movement, in particular the rate of movement (e.g. eddy current damping). The magnetic spring resists movement of the magnetic elements 120, therefore affects the rate of movement of the magnetic elements. The damper 100 of the present disclosure uses a combination of eddy current damping and magnetic spring damping.

As shown in FIGS. 4 and 11, the magnetic elements 120 may include at least one spring magnet 131 having a dipole substantially in the first direction X. The spring magnet 131 may be primarily responsible for providing the repelling force between adjacent magnetic elements 120, which creates the magnetic spring damping described above. The spring magnet 131 may also provide eddy current damping. For example, as shown in FIG. 4, all the magnets of a magnetic element 120 may be spring magnets 131. In this case, the spring magnets 131 are responsible for providing both the magnetic spring damping and the eddy current damping. A magnetic element 120 may only include one spring magnet 131. For example, as shown in FIGS. 4 and 11, the endmost magnetic elements 120 in the series of magnetic elements 120 may only include one spring magnet 131. However, other magnetic elements 120, not at an end of the series of magnetic elements 120 may also include only one spring magnet 131. A spring force may additionally be provided by springs (e.g. coil springs) and/or a viscoelastic material between one or more adjacent magnetic elements 120 or at one or more ends of the series of magnetic elements 120.

As shown in FIG. 11, the magnetic elements 120 may include at least one braking magnet 132 having a dipole substantially perpendicular to the first direction X. The braking magnets 132 may be primarily responsible for inducing eddy currents in the conductor, which creates the eddy current damping described above. A magnetic element may include a single braking magnet 132. The single braking magnet 132 may extend from one side of the magnetic element 120 to the opposite side of the magnetic element 120 in a direction perpendicular to the first direction X. A magnetic element 120 may include more than one braking magnet 132. The braking magnets 132 may be arranged at regular intervals around an axis in the first direction X, e.g. an axis through the centre of the magnetic element 120. Any number of braking magnets may be provided, e.g. 3 as shown in FIG. 11. However, an even number of braking magnets 132 in a magnetic element 120, e.g. 4, may make the magnetic element 120 easier to construct as the polarities of the braking magnets 132 can be alternated so that adjacent braking magnets 132 do not repel each other. Braking magnets 132 may be provided only to moveable magnetic elements 120.

Any combination of different magnetic elements 120 may be provided. That is any combination of magnetic elements 120 having different arrangements of magnets may be provided. For example, as shown in FIG. 4, the endmost magnetic elements 120 in the series may include only a single spring magnet 131, whereas magnetic elements 120 not at the ends may include two spring magnets 131. Alternatively, magnetic elements 120 not at the ends may not be the same as each other, e.g. they may include different arrangements of magnets.

The magnetic elements may include a low friction material at an interface between the magnetic element 120 and the casing 110. The low friction material may be nylon, for example. Magnetic elements 120 may comprise a carriage 133, to which one or more magnets 131, 132 may be connected, the carriage may include a low friction material, as shown in FIGS. 4 and 11.

As shown in FIG. 4, the carriage 133 may have a cylindrical outer surface. As shown in FIG. 12, the carriage 133 may include protrusions 134. The protrusions 134 may extend perpendicular to the first direction X when the magnetic element is in the casing 110), e.g. in a radial direction. The protrusions 134 may help guide the magnetic element 120 within the casing 110. Protrusions may be provided at regular intervals around an axis in the first direction X, e.g. an axis through the centre of the magnetic element. Protrusions 134 may be provided between adjacent braking magnets 132.

The magnetic elements 120 may include a detachable part 135, as shown in FIG. 5. A plurality of detachable parts 135 may be individually attached to the magnetic element 120 to change the mass of the magnetic element 120. Detachable parts 135 may be provided having different masses. The detachable parts may be formed of materials having different densities, e.g. lead, bismuth or some other non-ferrous dense material. The detachable part 135 may be positioned within a hollow (in the absence of the detachable part 135) portion of the magnetic element 120. For example, as shown in FIG. 5, the detachable part 135 may be within a cylindrical carriage 133 between two spring magnets 131. Changing the mass of the magnetic elements 120 in this way, can adjust the frequency response (e.g. shift the primary frequency) of the damping effect.

As shown in the Figures, the casing 110 may be in the form of a hollow tube. The casing 110 may comprise a tubular main body 111. The casing 110 may comprise end pieces 112, 113 at opposite ends of the main body 111, for covering the ends of the hollow tube. The hollow tube is arranged to hold the magnetic elements. The tube may have a cylindrical outer surface. However, the casing 110 is not limited to such an arrangement.

The main body 111 may have a cylindrical inner surface, as shown in FIG. 4. Alternatively, the main body 111 may have a cross-section, perpendicular to the first direction, which is non-circular in shape, as shown in FIG. 12.

The cross-sectional shape of the inner surface of the casing 110 may be such that it substantially conforms with the cross-sectional shape of the outer surface of the magnetic elements 120. For example, as shown in FIG. 4, the inner surface of the casing 110 may be cylindrical and the outer surface of the magnetic elements 120 may be cylindrical. For example, as shown in FIG. 12, the cross-section of the inner surface of the casing 110 (e.g. in a plane perpendicular to the first direction) may include a plurality of lobes 114. That is, the inner surface of the cylinder 110 may include ridges 115. The lobes 114 may be arranged to accommodate corresponding protrusions 134 of the magnetic elements and/or braking magnets 132. Such an arrangement allows the magnetic element 120 to be guided within the casing 110.

As shown in FIG. 12, lobes 114 and braking magnets 132 within the lobes 114 may be shaped such that the outer surface of the braking magnet 132 is parallel to the inner surfaces of the casing 110. This may allow greater coupling of the magnetic field and the conductor.

As mentioned previously, one or more magnetic elements 120 may be stationary with respect to the casing 110. For example, at least one of the magnetic elements may be secured to the casing 110, e.g. one or more of the magnetic elements 120 at an end of the serial arrangement of magnetic elements 120.

The casing 110 may comprise an adjustment device fix adjusting the position (e.g. the first direction X) at which the magnetic element 120 is secured to the casing 110. The adjustment device 116 may include a threaded portion 117. The adjustment device 116 may be configured such that turning the threaded portion 117 adjusts the position of the magnetic element in the first direction X. Adjusting the position at which the magnetic element 120 is secured to the casing 110 changes the stiffness of the magnetic spring, thus adjusting the damping provided by the damper 100 e.g. the frequency response of the damping elect. Furthermore, this may allow adjustment to the support height at which an object is supported by the damper 100.

The conductor may form part of the main body 111 of the casing 110. For example, the main body 111 may be made entirely from the conducting material. The conductor may have substantially the same cross section over the length of the conductor in the first direction X. The conductor may be arranged to completely surround the magnetic elements in a plane perpendicular to the first direction X.

The inside of the casing 110, containing the magnetic elements 120, should be accessible from outside the casing 110 so that at least one of the magnetic elements can be connected to one of the first or second objects. An opening 118 may be provided in the casing 110. As shown in the Figures, the opening may be provided in one of the end pieces 113 e.g. in the form of a hole in the first direction X. Alternatively, the opening may be provided in the main body 111 e.g. in the form of a groove substantially parallel to the first direction.

The connecting part 140 of one of the magnetic elements 120 may pass through the opening 118 in the casing 110. As shown in the figures, the connecting part 140 may include a rod 141. The rod 141 may pass through at least part of the mo cable magnetic element 120 of which it is a part. For this purpose, the at least one magnet of the magnetic element may be toroidal magnet. The connecting part 140 may extend in the first direction X.

Figure 7A:
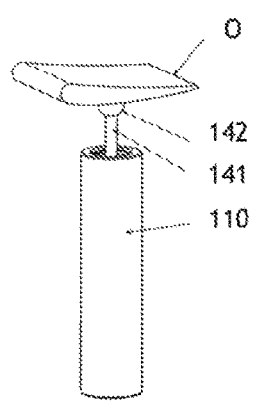
FIGS. 7(A)-(C) show example dampers with different connectors.
Figure 7B:
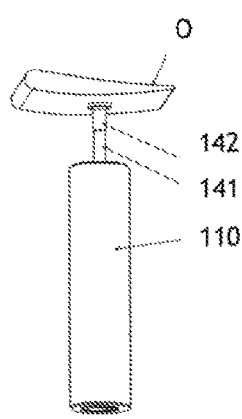
Figure 7C:
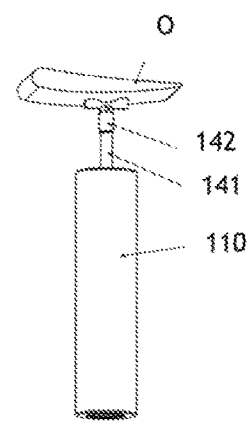

The connecting part 140 may include an end portion 142 (e.g. at the end of the rod 141) configured to contact the first or second object. The end portion may be secured to the first or second object or may support the object without a fixed connection. The end portion may include a threaded portion, as shown in FIGS. 1 to 4. The end portion 142 may include a ball shaped portion (e.g. detachably attached to the threaded portion), as shown in FIG. 7(A). The ball shaped portion may support an object being damped. The shape of the ball may allow the supported object to pivot at the contacting surface. The end portion 142 may include a flat portion (e.g. detachably attached to the threaded portion), or alternatively a portion having a surface that's shape conforms to the shape of an object being supported, as shown in FIG. 7(B). The end portion 142 may be arranged to pivot, as shown in FIG. 7(C) e.g. about one, two or three orthogonal axes. The end portion 142 may be made from a stiff material such as steel, aluminium or brass. The end portion 142 may be made from or coated with rubber. Or some other compliant and or soft material.

Figure 6:
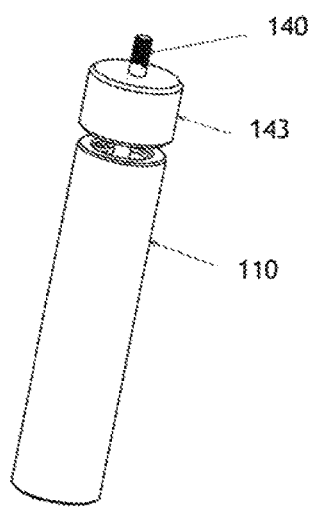
FIG. 6 shows an example damper.

As shown in FIG. 6, the connecting part 140 may include a detachable part 143. The detachable part may be replaced with detachable parts having different masses. The detachable parts 143 of the connecting part 140 provide a similar effect to the detachable parts 135 of the magnetic elements 120, namely changing the mass of the moving parts of the system to adjust the strength of the damping affect. The detachable parts 143 of the connecting part 140 may include a hole through which the rod 141 of the connecting part 140 may pass. The detachable parts 143 of the connecting part 140 may be cylindrical in shape. The detachable parts 143 may be formed of materials having different densities, e.g. lead, bismuth or some other non-ferrous dense material.

Figure 13:
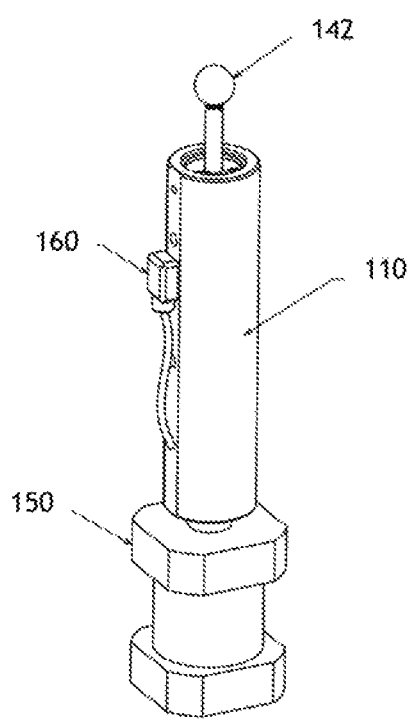
FIG. 13 shows an example damper.

As shown in FIG. 13, the damper 100 may include a motor 150 for driving the adjustment device. This may allow the damping to be tuned during use of the damper and/or without needing direct access to the damper. The damper 100 may include sensor 160 for sensing the relative motion between the first and second object e.g. the velocity of a moveable magnetic element, connected to the first or second object, relative to the casing.

The sensor 160 may be a magnometer, an accelerometer, an optical encoder or a load-cell, for example. In the case a magnometer is used, this may sense the position of a magnetic element 120 connected to the first or second objects. In the case of an accelerometer being used, this may be connected to the connecting part 140 attached to a moving magnetic element and be used to measure the accelerating of the connecting part 140. In the case of an optical encoder being used a sensor of the encoder and an encoded part of the encoder may be connected to different parts of the damper, first, or second objects that move relative to one another, to sense the relative positions thereof. In the case of a load-cell being used, this may be provided between the first or second object and the end part 142 of the connecting part 140 attached to a moving magnetic element and sense vibrations on the first or second object.

The motor 150 may be driven based on the output of the sensor 160 e.g. using a feedback loop such that the damping force increases as the relative movement between the first and second objects increases and vice versa. This may be controlled for example by a CPU or microcontroller. Using the combination of a motor 150 and a sensor 160 provides an active damping system. This may be beneficial where damping and/or material support needs to be stronger or weaker at different times of the machining process, e.g. bulk material removal and finishing. Furthermore, this allows adjustment to the support height at which an object is supported by the damper 100.

The invention claimed is:

1. A damper for damping the motion of a first object relative to a second object, the damper comprising:
   a casing comprising an electrical conductor;
   a plurality of magnetic elements arranged serially in a first direction within the casing and each comprising at least one magnet arranged such that adjacent magnetic elements repel each other in the first direction;
   wherein at least one of the magnetic elements is moveable relative to the other magnetic elements within the casing and relative to the casing;
      the electrical conductor is arranged such that movement of at least one of the moveable magnetic elements relative to the casing induces an electrical current in the electrical conductor, the magnetic field produced by the electrical current providing a braking force to the moving magnetic element; and
   at least one of the moveable magnetic elements includes a first connecting part and either the casing or at least one of the other magnetic elements includes a second connecting part, one of the connecting parts being for connecting the damper to the first object, and the other of the connecting parts being for connecting the damper to the second object.

2. The damper of claim 1, wherein the at least one magnet of each of the magnetic elements includes at least one spring magnet having a dipole substantially in the first direction.

3. The damper of claim 2, wherein the at least one magnet of at least one of the magnetic elements includes two spring magnets, wherein the two spring magnets are arranged serially in the first direction, are fixed in relation to each other and repel each other in the first direction.

4. The damper of claim 2, wherein the at least one magnet of at least one of the magnetic elements includes at least one braking magnet having a dipole substantially perpendicular to the first direction.

5. The damper of claim 4, wherein a plurality of braking magnets are provided at regular intervals around an axis in the first direction in at least one magnetic element.

6. The damper of claim 5, wherein an even number of braking magnets are provided in at least one magnetic element.

7. The damper of claim 1, wherein at least one of the magnetic elements at an end of the serial arrangement of magnetic elements is secured to the casing.

8. The damper of claim 7, wherein the casing comprises an adjustment device, for adjusting the position at which the magnetic element is secured to the casing.

9. The damper of claim 8, further comprising a motor configured to drive the adjustment device.

10. The damper of claim 9, comprising a sensor for sensing the relative motion between the first and second objects, wherein the motor is configured to drive the adjustment device based on the output of the sensor.

11. The damper of claim 1, wherein at least one of the magnetic elements comprises a sleeve having a low friction material at an interface between the magnetic element and the casing.

12. The damper of claim 1, wherein the casing has a cylindrical inner surface having a central axis in the first direction.

13. The damper of claim 1, wherein the cross section of the inner surface of the casing in a plane perpendicular to the first direction has a plurality of lobes.

14. The damper of claim 11, wherein the at least one magnet of each of the magnetic elements includes at least one spring magnet having a dipole substantially in the first direction and at least one braking magnet having a dipole substantially perpendicular to the first direction, wherein the braking magnets are arranged within the lobes.

15. The damper of claim 2, wherein at least one magnetic element further comprises a detachable mass.

16. An apparatus for machining an object, the apparatus comprising the damper of claim 1, wherein the damper is configured to damp the motion of the object relative to at least part of the apparatus for machining the object.

17. A kit of parts comprising:
the damper of any one of claim 1, wherein at least one magnetic element is configured such that a detachable mass may be attached to said magnetic element; and
a plurality of detachable masses having different masses and configured to be attachable to the at least one magnetic element to change the mass of the magnetic element.

* * * * *